Patented Jan. 17, 1939

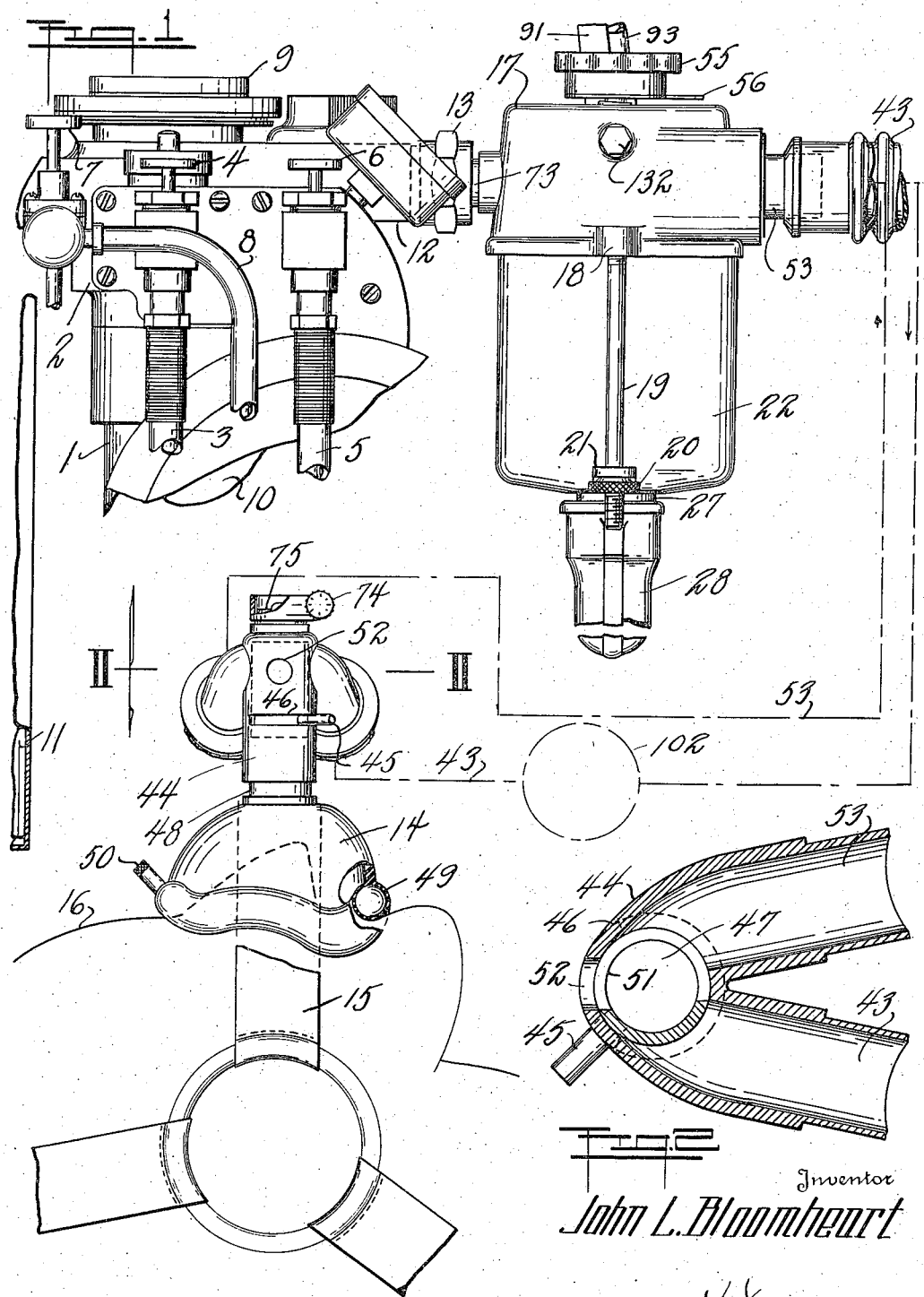

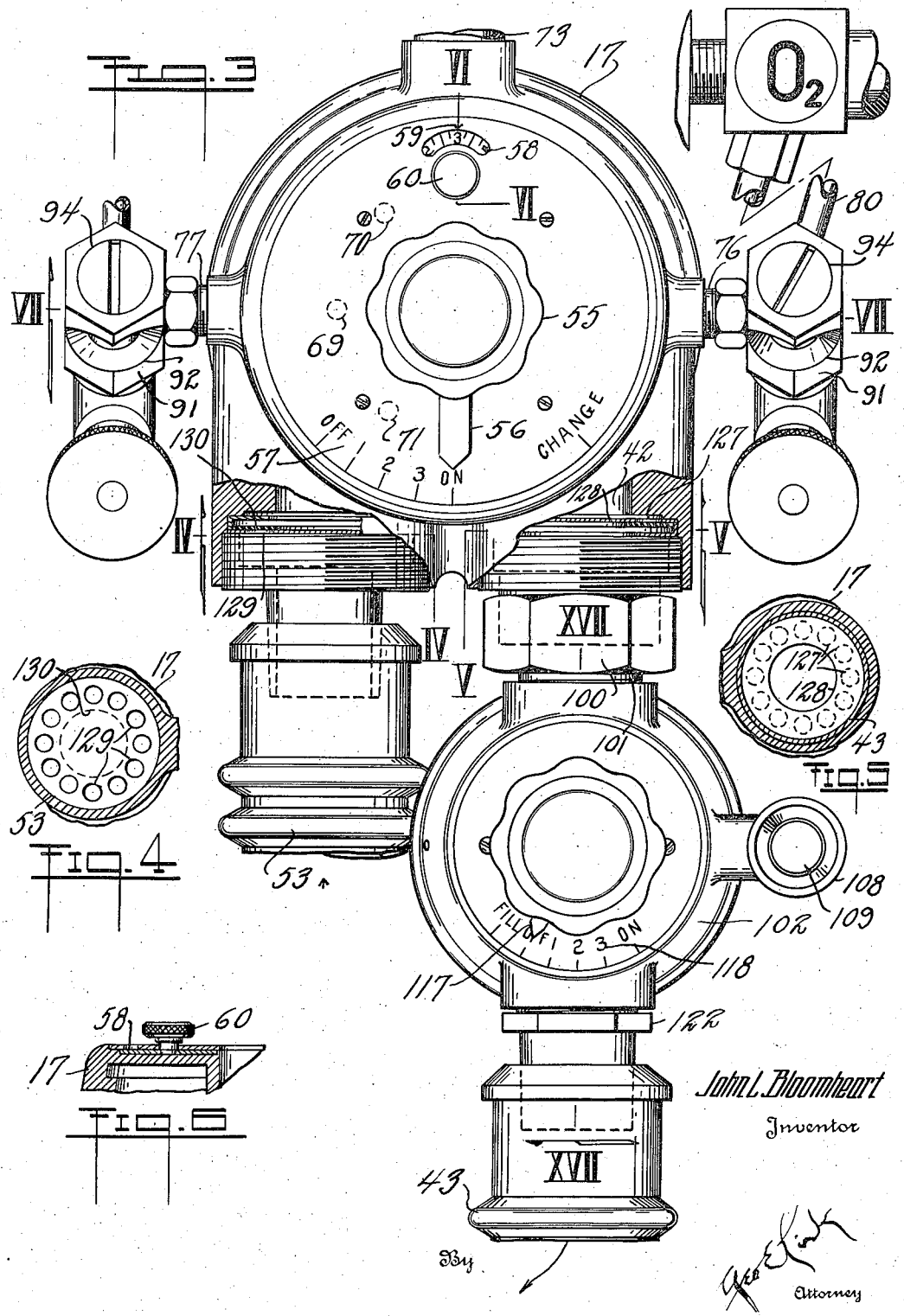

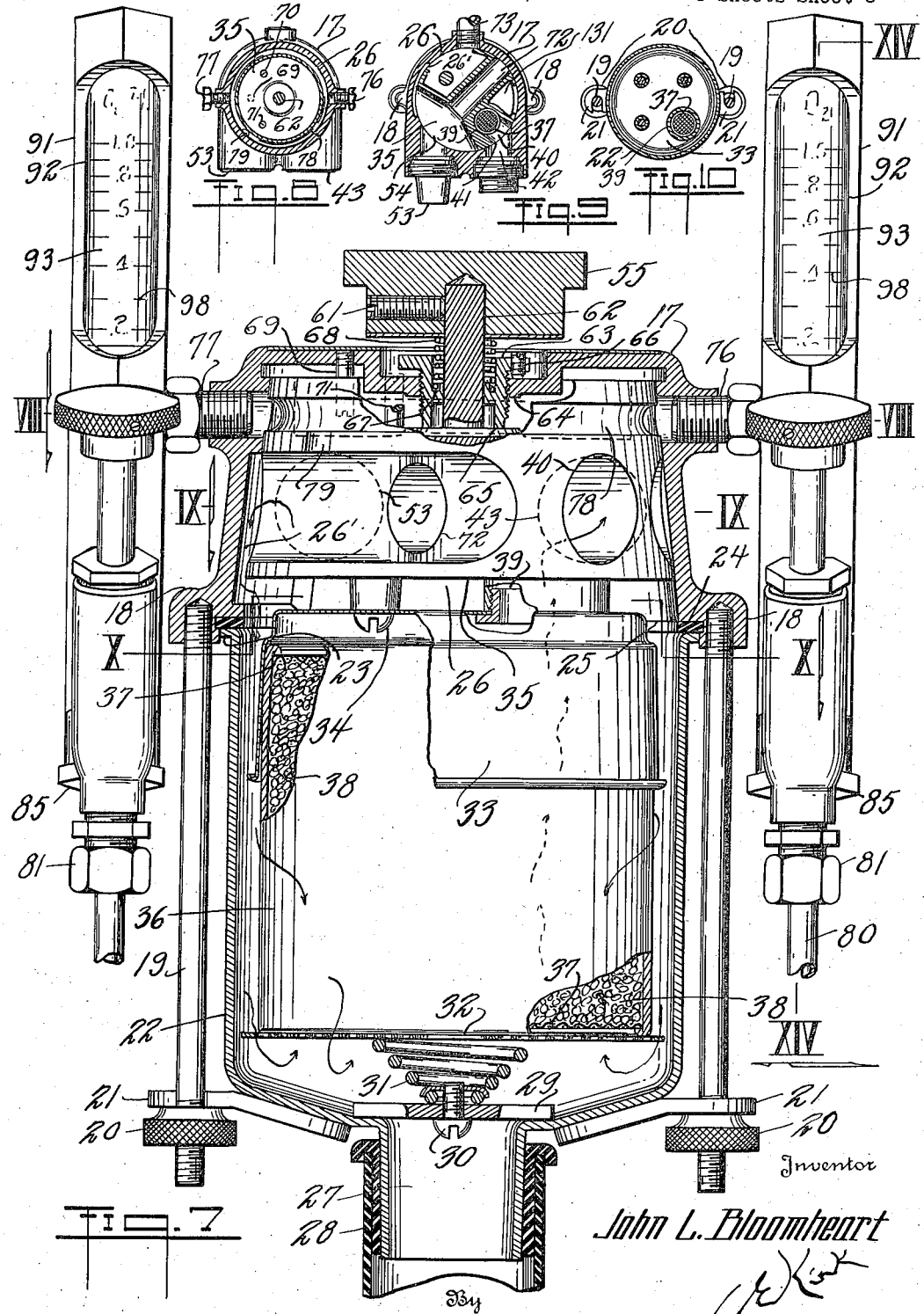

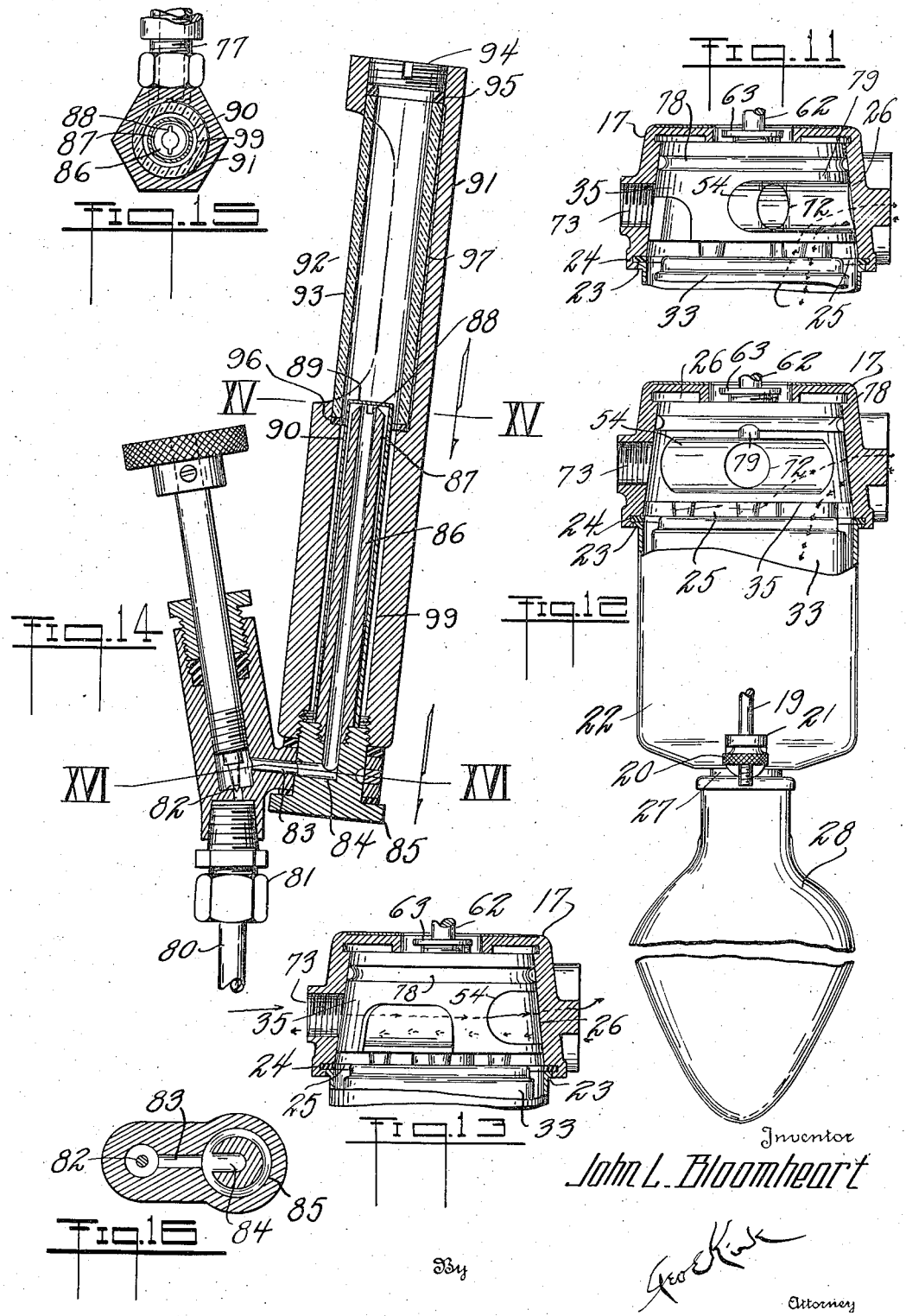

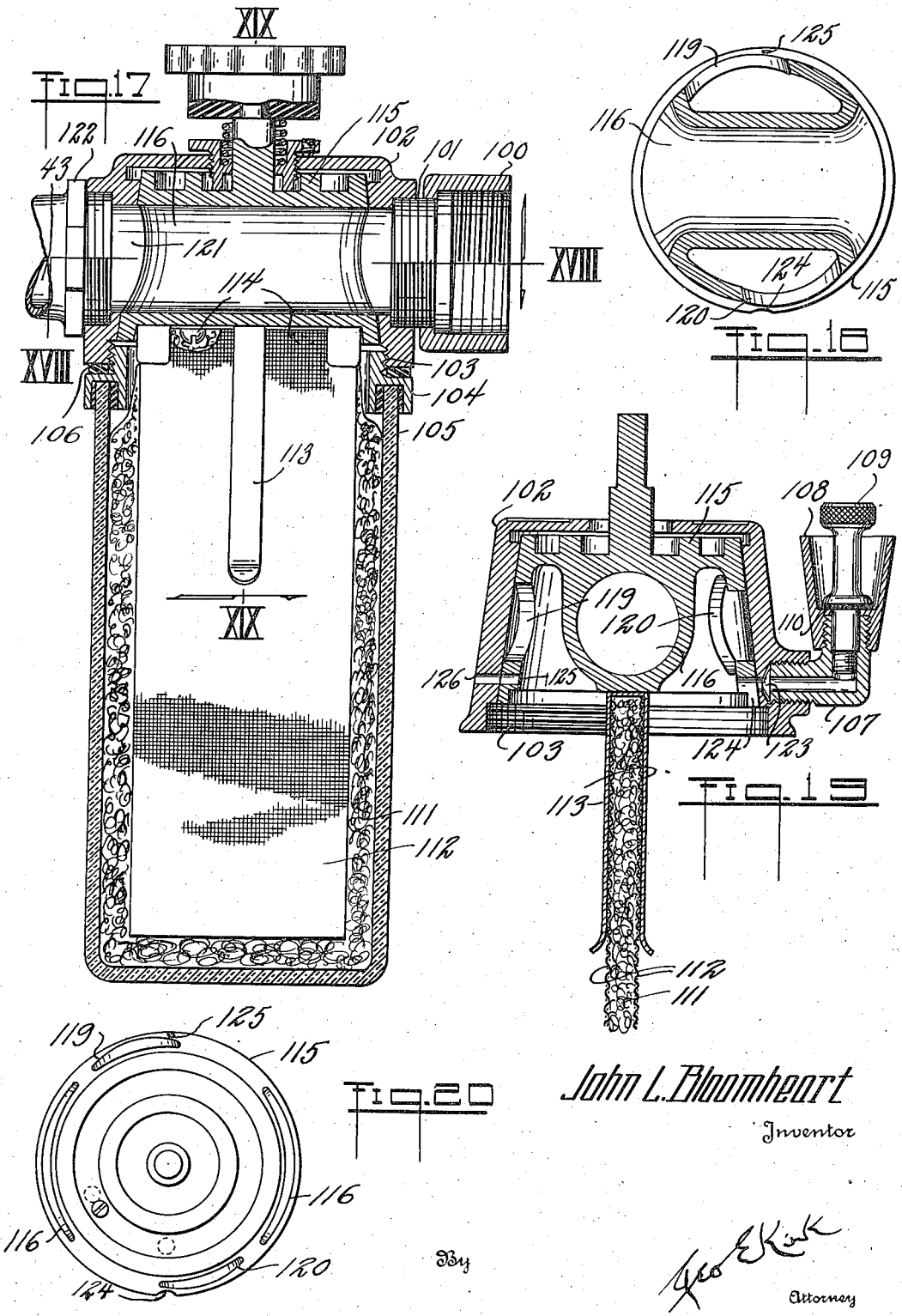

2,144,479

UNITED STATES PATENT OFFICE 2,144,479

GAS ADMINISTRATION

John L. Bloomheart, Toledo, Ohio, assignor to Martha F. McKesson, Toledo, Ohio

Application December 7, 1936, Serial No. 114,587

13 Claims. (Cl. 128—191)

This invention relates to control of gas for respiration, especially in connection with attention to a patient.

This invention has utility when incorporated in safeguards having to do with supply-gas efficiency and economy, more particularly in assembly for control of gases and taking out of carbon dioxid gas as exhaled, with residual gas in respiratory circuit for rebreathing.

Referring to the drawings:

Fig. 1 is a fragmentary view of an embodiment of the invention as an absorber in connection with anesthetic administration equipment;

Fig. 2 is a section on the line II—II, Fig. 1, for the valve adjacent the mask;

Fig. 3 is a plan view of the absorber head with adjacent ether cup, parts being broken away;

Fig. 4 is a fragmentary view on the line IV—IV, Fig. 3, showing a check valve against flow from the absorber;

Fig. 5 is a fragmentary view on the line V—V, Fig. 3, showing the check valve against return of gas to the absorber;

Fig. 6 is a section on the line VI—VI, Fig. 3, of the time indicator as in use by the absorber cartridge;

Fig. 7 is a section on the line VII—VII, Fig. 3, showing the absorber condition with the valve in elevation;

Fig. 8 is a section on the line VIII—VIII, Fig. 7, showing the auxiliary supply as independent of valve position in the absorber;

Fig. 9 is a section on the line IX—IX, Fig. 7, showing the valve controls in port relation for "on", not intermediate of "on", nor "change";

Fig. 10 is a section on the line X—X, Fig. 7, showing the positioning of the valve openings therebelow;

Fig. 11 is a side elevation of the valve from the left of Fig. 7, and accordingly in absorber "on" position;

Fig. 12 is a view similar to Fig. 11, with the valve shifted clockwise to "off" position (Fig. 3) for the absorber, the assembly herewith showing that in this set-up the breather bag is still connected for operation as in Fig. 11;

Fig. 13 is a view similar to Fig. 11 with the valve shifted counter-clockwise (Fig. 3) to absorber "change" position, with all port connections through the head independently of into the absorber;

Fig. 14 is a view on the line XIV—XIV, Fig. 7, showing the auxiliary gas control and flow indication therefor;

Fig. 15 is a section on the line XV—XV, Fig. 14;

Fig. 16 is a section on the line XVI—XVI, Fig. 14;

Fig. 17 is a section on the line XVII—XVII, Fig. 3, through the ether cup;

Fig. 18 is a section on the line XVIII—XVIII, Fig. 17, showing the valve in position to cut out the ether cup;

Fig. 19 is a section on the line XIX—XIX, Fig. 17, showing the valve and depending partition therefrom; and Fig. 20 is a plan view of the valve of Fig. 19.

Gas administering machine, as for anaesthesia, is shown provided with supporting stem 1 to head 2. From pressure gas supply cylinder, duct 3 may extend to valve 4, say for nitrous oxid supply on one side of the head 2 with say analogous equipment on the opposite side for oxygen. From pressure gas supply tank, duct 5 may extend to manually controllable valve 6 for supplemental or different gas supply as ethylene. Pulse pressure device may be cut in by valve 7 having duct 8 leading therefrom. The head 2 is provided with rotary valve 9 as flow proportion for the gas supplied by the valve 4 and its companion, such gas being for supply from low pressure chambers or bags 10 and mixture-containing rebreathing bag 11 for passage by delivery way 12 from the head 2, past fitting 13 on the way to mask or nozzle 14, there assembled by straps 15 in position on head 16 of a patient to be treated. This mask or nozzle 14 is herein shown as one to cover the mouth and nose. This general adaptation of gas proportioning and supply is of the general structure as that shown in Patent No. 2,035,492, March 31, 1936, McKesson.

In carrying out the invention herein, intermediate equipment is introduced for gas control and even to the degree of complete substitution therefor as may be found acceptable by the operator. To this end, head 17 of absorber is for removing an ingredient or proportion of the exhaled gas, say carbon dioxid, by aid of soda lime. This head 17 is provided with ears or lugs 18 (Figs. 1, 8) to receive stud bolts 19. The remote portions of such stud bolts are engaged by knurled nuts 20 for abutting forks 21 fixed with chamber 22 having upper flange 23, brought by the nuts 20 into clamping position at compressible gasket 24 about open bottom 25 of valve chamber 26 in the head 17. This chamber 22 has depending neck 27 therefrom for mounting extensible reservoir or rubber bag 28 as a primary or auxiliary rebreathing bag.

Cross bar 29 at the portion of the chamber 22 remote from the flange 23 maintains the chamber 22 at all times open to the rebreathing bag 28. This cross bar 29 has screw 30 therein mounting spiral spring 31 in position to abut and yieldably position perforate disk 32 and thrust such toward depending sleeve or seat 33, fixed by screws 34 with valve member 35 in the valve chamber 26. Between this seat 33 and the yieldably opposing disk 32, there may be inserted chamber herein shown as tubular member 36 having foraminous termini 37 completing container or cartridge for granules or particles 38, say of soda lime. There is, accordingly, provided this absorber or filtering partition between the chamber 22 and outlet port 39 from the cartridge into passage 40 of the valve 35. This passage 40 has port 41 (Fig. 9) as in register with passage 42, and ultimately duct 43 therefrom may extend directly to fitting 44 (Figs. 1, 2), from which protrudes arm 45 rockable in slot 46 from "off" position (Fig. 2) clockwise to "on" position, thereby permitting air flow from the duct 43 into tubular chamber 47 of this cylindrical valve, and concentrically therefrom by duct 48 into the mask 14 having pneumatic rim 49, inflation or deflation of which may be controlled by valve 50. This rocking of the valve handle 45 causes the valve to shift its port 51 away from open position with port 52, thereby cutting off air supply into the equipment herein.

At the position shown in Fig. 2, air supply is open to the patient for inhalation and exhalation independently of the equipment, for the gas supply is by way of the line 43 and gas return is by way of line 53. It is thus seen that inflow and exit may be at the port 52 independently of through the duct 53. The line 53, when the port 52 is closed, conducts exhaled gases back to the head 17 for flow into port 54 (Fig. 9) of the valve 35, and thence by cut-out 26' through clearance opening 25 about the sleeve 33 in the chamber 22.

This exhaled gas is thereby directed outside the paper cylinder 36 of this substitutive cartridge for entrance through the perforate disk 32 and the wire screen or fabric 37 into the absorber, there to have the carbon dioxid removed therefrom by the soda lime 38 as such gas is drawn by inhalation through the port 39, chamber 40, port 41, for entrance into the supply duct 43 in completing the supply circuit again in this respiratory treatment of the patient, wherein the valve 35 is adjusted by knurled handle 55 to bring pointer 56 at the designated "on" position on scale 57 (Fig. 3).

Inasmuch as a cartridge of the soda lime type is subject to exhaustion under measure of treatment, check for consumption period is provided herein at scale 58, which may be shifted as to pointer 59 by knurled handle 60 (Figs. 3, 6). Accordingly, if this cartridge may be of a capacity to stand normal breathing for say four hours, and it has been used three hours, this scale should have the marker "3" at the pointer 59 so that the operator may be guided that the cartridge could have its use continued without exhaustion for a one hour period.

This knurled head 55 is anchored by set screw 61 (Fig. 7) with stem 62 fixed with the valve 35. This stem 62 extends through externally threaded sleeve 63 anchored with threading in upper wall 64 of the valve head 17. This sleeve 63 has lower face 65 adjusted to determine the position of the valve 35 in its seat in the head 17. As so adjusted, this sleeve may be anchored by set screw 66. This sleeve 63 provides ledge 67 as a seat for helical spring 68 between the knurled handle 55 and the housing, thus yieldably holding the valve in the seated assembly with the valve seat. Extent of rotation of this valve body 35 in its seat is determined by set screw 69 (Figs. 3, 7, 8) fixed with the valve head 17, which at "off" position of the pointer 56 abuts set screw 71 fixed with the valve 35, and at "change" position abuts set screw 70, also fixed with the valve head 35.

A prime feature of utility in this absorber is that during the continuance of respiration control for the patient there may be substitution or replacement of the cartridge or absorber. To this end, it is only necessary to operate the handle 55 in shifting the valve 35 to cut off or by-pass the absorber as to the gas administering supply from the duct 12 (Fig. 11). The pointer 56 is accordingly shifted from the "on" position (Figs. 3, 7, 9, 11) counter-clockwise on the scale 57 to "change" position (Fig. 13).

In this set-up, the ducts 43, 53, each, connect with the valve chamber portion 26 and such is in communication by ports 54, 72 with passage 73, connected by the fitting 13 with the passage 12, and the breathing is directly through the gas supply with the rebreathing bag 11 now in use instead of the rebreathing bag 28. In this interval the controlled anaesthesia or resuscitation condition for patient may be maintained so that there may be no gap for the respiration control of the patient during the replacement or substitution of the gas absorber cartridge in the chamber 22. At once this operation is completed, the handle 55 may be rotated to bring the valve from this "change" position (Fig. 13) to "on" position (Figs. 7, 9, 11).

In the event it be desired to cut out the absorber with absence of occasion for removing the cartridge or to regulate the degree of absorption, the shifting is from "on" position over the graduations 57 (Fig. 3) by rotation clockwise toward "off" position, thereby shifting the port 41 partially, or to all, out-of-register with the passage 42 (Fig. 9).

At the "off" position for the absorber (Fig. 12), the port 54 is in register with the duct 53 for exhalation. However, the port 40 is not in register with the port 42. Adjacent the port 72 in the valve 35 is port 131 (Fig. 9) which is shifted to register with the port 42 and thereby in communication with the valve chamber 26 for completing the circuit from the absorber as to its rebreathing bag but not through the absorber as a partition.

In the "on" or "off" position, there may be gas supply past the proportioning valve to supplement the absorber consumption, and in this operation, the rebreathing bags 28 and 11 may be each effective as reserve yieldably responsive to the pressure under which operation is occurring.

However, it is to be noted, with the control valve handle 55 turned to "change" position (Fig. 13), the rebreathing bag 28 is entirely cut out. In practice, with the pressure set-up primarily effective at the rebreathing bag 28, there may be no operation of the rebreathing bag 11 over a period of time if occasion for supplementing anaesthesia does not arise or if there be sufficient replenishment of gas loss by the auxiliary supplies at the head 17. The amount of this pressure of operation to affect the response of the rebreathing bag 11 may be controlled by the pressure in the system adjusted by knurled handle 74 (Fig. 1) for relief valve 75 in the fitting 44 adjacent the mask 14.

This replenishment for consumed gas, whether oxygen, ethylene, or some other type of gas as cyclopropane ($C_3H_6$) may be by seepage say of oxygen through duct 76 (Fig. 7) and other gas 77 with sufficient quantity thereof to make response as desired. These ducts 76, 77, are adjacent an annular groove 78 in the head 35, which has communication out of such groove by downward groove portions 79. Thus at any open or closed position as determined by the handle 55, there is communication to the chamber portion 26 in communication by port 54 to under clearance region 25 or directly into the duct 42.

Supply gas as oxygen may be past a reducing valve at an oxygen supply cylinder, thence by duct 80 (Figs. 7, 14), and fitting 81, there additionally controlled by needle valve 82 to flow by way 83 into duct 84 and fitting 85 mounting tube 86 having externally reduced diameter portion 87 and terminal port 88. Capping this tube 86 is closed end 89 of sleeve or cup 90 telescoping this tube 86 and as shifting away from the terminus 88 having increased clearance relatively to the sleeve or tube 86. The flow of supply gas, whether oxygen or other gas under the control rate, accordingly forces this cup or capped sleeve 89, 90, to different positions in its telescoping relation to the sleeve or tube 86 according to the volume of this gas.

About this cap and supply tube is housing 91 having window 92, in which is transparency 93 closing the chamber in this housing 91 by plug 94 against gasket 95, holding the transparency 93 in the assembly against the opposing gasket 96. The cylindrical transparency 93 has clearance as to the housing 91 in which is strip 97 disclosing scale 98 through the window opening 92, which scale is obscured by the rise of the cup 89, 90, in front thereof, thus giving the operator readily visible disclosure of the flow rate, say in liters, of the particular gas for replenishment. This gas as spilled past the cup 89, 90, into chamber 99 may pass therefrom by the duct 76 into the head 17 as an indicated control for continuous replenishment.

The duct 42 herein is assembled by fitting 100 in register with duct 101 in head 102 of the ether cup, or supplemental anaesthesia agent supply. This head 102 has threaded connection 103 (Fig. 17) with which may be assembled ring 104 of chamber 105, assembled into sealing position at gasket 106. This head 102 has L-fitting 107 (Fig. 19) for funnel 108 having removable plug 109. Insertion of this plug 109 in thread assembly to compress gasket 110 seals against escape of vapor from this vaporizer, while opening allows admission of anaesthesia substance to be vaporized, as ether. This may be poured into the chamber 105 to the desired amount and the plug 109 replaced. In this chamber 105 there depends fibrous material 111 between wire screen or fabric sides 112, anchored by clips 113 as a partition assembled by screws 114 with the under side of valve 115 fitting in the head 102. This valve has direct cross-over port 116 (Fig. 18) cutting out or by-passing this vaporizer or ether chamber 105.

At shift position, indicated by pointer 117 (Fig. 3) there may be from the "fill" position as by-passing for the valves (Figs. 17, 18) a shift toward "on" position as indicated (Fig. 3) by graduations 118, thereby controlling the extent of opening of ports 119, 120 (Fig. 18), thus allowing gas to enter at one side of the partition 111, 112, and checking flow thereof against exit except on the opposite side of said partition 111, 112. This foraminous, absorbent partition is effective to impregnate the passing supply gases with desired anaesthesia material from the vaporizer cup, thence to flow by passage 121 and fitting 122 into the duct 43 toward the gas mask 14.

Accordingly, in this set-up, there may be selective use in this respiration equipment of one or more and any combination of this set-up in the region of control, and there is thus in this selective handling practical manipulation over an indefinite period for anaesthesia in any desired degree, absorption with a replenishment selected, and supplemented by a vaporizer. The vaporizer may be cut out with the absorber for anaesthesia administering machine or respirator left in. The absorber may be operated alone, that is, without the anaesthesia machine or the vaporizer. The anaesthesia machine may be operated with or without the absorber, with or without the ether cup or vaporizer. This selective control with possibilities for replenishment even of the supply gases without removal of the mask from the patient is practical herein not only as the absorber cartridge replacement but as to replacing of supply cylinders on the anaesthesia machine or replacing of supply cylinders at the absorber.

In the use of the ether cup for charging such by pouring ether into the funnel 108, such passes by way of the L-fitting 107 and port 123 by way of clearance 124 in the valve 115, thereby to enter the chamber 105 on one side of the partition 111, 112. This entrance is not against pressure of vapor in this chamber, for when the ports 123, 124, are in register with the fitting 107, port 125 in the valve 115 is in register with outlet port 126. As charging of the ether cup is effected, it is desirable upon replacing of the plug 109 that there additionally be sufficient rotation of the valve 115 to bring the port 125 out of register with the port 126.

The one way flow from the absorber into the duct 43 from the passage 42 is through annular series of openings 127 (Figs. 3, 5) into the region toward the duct 43. However, any reversal of flow causes ring disk 128 to slap back against these ports 127 and close off reverse flow. Oppositely to this action, flow from the duct 53 is normally toward the head 17 by way of ports 129 (Figs. 3, 4). Any reversal of flow, that is, from the head 17 toward the duct 53 causes disk 130 to move in closure position against the ports 129 and shuts off as an effective check valve this direction of current flow.

In the matter of the continuous replenishment gases at the absorber, such may be as to one port or duct 76 or to a plurality thereof, two being shown, the second one as duct 77. In the event the head 17 be equipped for more than one of these replenishments and but one is to be used, the unused duct 77 may be shut off by plug 132 (Fig. 1).

What is claimed and it is desired to secure by United States Letters Patent is:

1. A gas administering machine assembly including a respirable gas supply, a delivery nozzle, an absorber therebetween, a rebreathing bag with which said absorber is in series, said absorber being toward the nozzle from said bag, and valve mechanisms for gas delivered by the supply, controllable to isolate said absorber with the supply in communication with the delivery nozzle independently of through said rebreathing bag and absorber, one of said mechanisms including a proportioning valve.

2. In gas administration, a delivery nozzle, an absorber in circuit with the nozzle, and a control valve at the absorber for the circuit including a seat, and absorber-material-providing cartridge in said seat, said valve being adjustable to isolate said absorber from the circuit for cartridge replacement.

3. In gas administration, a gas supply, a delivery nozzle, and a circuit therebetween embodying an absorber chamber, a valve providing intake to said chamber, an over-volume receiver connected to said chamber, said valve providing an outlet port for the chamber as in series from the receiver, and an absorber material partition between said port and chamber, said valve being adjustable to connect said supply to said nozzle and isolate the receiving chamber as a unit from said circuit.

4. In gas administration, a chamber, a valve, a housing movable with the valve providing a seat for the chamber, said housing having a port into the valve and therefrom, and a control for the valve for isolating the chamber.

5. In gas administration embodying an absorber comprising a chamber, a valve, a housing movable with the valve providing a seat for the chamber, and a housing as to which the valve is movable and having a wall opposite from the chamber, a valve seat for said valve between the wall and chamber seat, and control means for the absorber protruding through the wall.

6. In gas administration, a valve housing having a wall, a chamber seat away from the wall, there being a valve seat having flaring taper from the wall toward and concentric with the chamber seat, a valve in the seat, a chamber extending from the chamber seat, and partition means in the chamber movable with the valve.

7. In gas administration, a valve housing having a wall, a chamber seat away from the wall, a valve seat having flaring taper from the wall toward the chamber seat, a valve in the seat, a chamber extending from the chamber seat, and partition means in the chamber connected to the valve, and valve control means protruding through the wall.

8. In gas administration, a chamber carrier, a valve housing, a valve in the housing and concentric with the carrier, a chamber mounted by the carrier coaxial with and controllable by said valve, a respirable gas supply to said housing controlled by said valve, and a respirable gas supply to said housing independent of said valve.

9. In gas administration, a chamber carrier, a valve housing, a valve in the housing and concentric with the carrier, a chamber mounted by the carrier coaxial with and controllable by said valve, a respirable gas supply to said housing controlled by said valve to by-pass said chamber, and a respirable gas supply to said housing independent of said valve and continuous whether or not said valve be by-passed.

10. In gas administration, a chamber carrier, a valve housing, a valve in the housing and concentric with the carrier, a chamber mounted by the carrier coaxial with and controllable by said valve, a respirable gas supply to said housing controlled by said valve, a respirable gas supply to said housing independent of said valve, and an indicator of gas volume flow for one of said supplies.

11. A plug valve, a housing therefor, a chamber, a partition in the chamber directly connected to the valve, said housing having a port inlet to and port outlet from the valve on opposite sides of the partition, and said valve being adjustable to have port means directly between the housing ports for flow directly through the valve independently of about said partition or through said chamber.

12. In gas administration, a machine head, a valve device attachable to said head, a chamber mounted on the device, a tube in said chamber having an outlet port, a skirted cap for the tube telescopic therewith to different clearance areas between the tube and skirted cap.

13. In gas administration, a machine head, a valve device attachable to said head, a chamber mounted on the device, a tube in said chamber having an outlet port, a skirted cap for the tube telescopic therewith to different clearance areas between the tube and skirted cap, said chamber having graduated position-disclosing means between the tube and skirted cap.

JOHN L. BLOOMHEART.